(12) United States Patent
Ghahramani et al.

(10) Patent No.: US 9,673,964 B2
(45) Date of Patent: Jun. 6, 2017

(54) ACTIVE LOAD MODULATION IN NEAR FIELD COMMUNICATION

(71) Applicant: QUALCOMM Incorporated, San Diego, CA (US)

(72) Inventors: Mohammad Mahdi Ghahramani, San Jose, CA (US); Mazhareddin Taghivand, Campbell, CA (US); Niranjan Anand Talwalkar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 14/625,518

(22) Filed: Feb. 18, 2015

(65) Prior Publication Data

US 2016/0241380 A1    Aug. 18, 2016

(51) Int. Cl.
*H04B 5/00* (2006.01)
*H04L 7/00* (2006.01)
*H04L 7/033* (2006.01)

(52) U.S. Cl.
CPC ......... *H04L 7/0012* (2013.01); *H04B 5/0031* (2013.01); *H04L 7/0331* (2013.01)

(58) Field of Classification Search
CPC ... H03D 3/24; H03K 7/08; H03K 9/04; H03L 7/06; H03L 7/07; H03L 7/083; H03L 7/20; H04B 5/00; H04B 5/0031; H04B 5/0056; H04B 15/00; H04L 7/00; H04L 7/0012; H04L 7/033; H04L 7/0331; H04L 27/02; H04L 27/04

USPC ............ 327/148, 154, 156, 159; 331/25, 34; 332/128; 375/219, 238, 259, 268, 295, 375/316, 375, 376; 455/41.1, 106
See application file for complete search history.

(56) References Cited

U.S. PATENT DOCUMENTS

| | | | | |
|---|---|---|---|---|
| 4,281,412 A | * | 7/1981 | Wissel | .................. H04L 7/0332 329/310 |
| 7,599,462 B2 | | 10/2009 | Melanson | |
| 8,112,054 B2 | | 2/2012 | Gehring et al. | |
| 2009/0149202 A1 | * | 6/2009 | Hill | ........................... G01S 5/18 455/456.6 |
| 2010/0190436 A1 | * | 7/2010 | Cook | ....................... H04B 5/00 455/41.1 |
| 2011/0292973 A1 | | 12/2011 | Kianush et al. | |

(Continued)

FOREIGN PATENT DOCUMENTS

DE        102014204065 A1    9/2014

OTHER PUBLICATIONS

Gebhart M., et al., "Active Load Modulation for Contactless Near-Field Communication", RFID-Technologies and Applications (RFID-TA), 2012 IEEE International Conference on, IEEE, Nov. 5, 2012 (Nov. 5, 2012), pp. 228-233, ISBN: 978-1-4673-4656-6.

(Continued)

*Primary Examiner* — Shawkat M Ali
(74) *Attorney, Agent, or Firm* — Arent Fox, LLP

(57) ABSTRACT

An example method for active load modulation includes determining a modulated portion and an unmodulated portion of a bit. Further, the example method includes during the modulated portion of the bit, holding a phase of a received carrier signal. In addition, the example method includes, during the unmodulated portion of the bit, synchronizing to the received carrier signal.

22 Claims, 7 Drawing Sheets

(56) References Cited

U.S. PATENT DOCUMENTS

| | | | |
|---|---|---|---|
| 2012/0071089 A1* | 3/2012 | Charrat | H04B 5/0031 |
| | | | 455/41.1 |
| 2012/0083205 A1* | 4/2012 | Marcu | G06K 7/0008 |
| | | | 455/41.1 |
| 2013/0107913 A1* | 5/2013 | Savoj | H03L 7/0891 |
| | | | 375/219 |
| 2014/0003548 A1 | 1/2014 | Lefley | |
| 2014/0021799 A1* | 1/2014 | Sankararamalingam | H04B 5/0037 |
| | | | 307/104 |
| 2014/0191786 A1 | 7/2014 | Praamsma et al. | |
| 2014/0192931 A1* | 7/2014 | VandeBeek | H04L 27/06 |
| | | | 375/320 |
| 2014/0218080 A1 | 8/2014 | Choke et al. | |
| 2014/0273830 A1* | 9/2014 | Wong | H04B 5/0031 |
| | | | 455/41.1 |
| 2014/0341327 A1* | 11/2014 | Raggam | H04L 7/0331 |
| | | | 375/376 |
| 2015/0178525 A1 | 6/2015 | Lee et al. | |
| 2015/0180608 A1* | 6/2015 | van de Beek | G06K 19/067 |
| | | | 455/41.1 |
| 2016/0241384 A1* | 8/2016 | Frantzeskakis | H04L 7/02 |

OTHER PUBLICATIONS

International Search Report and Written Opinion—PCT/US2016/013846—ISA-EPO—May 4, 2016. 14 Total Pages.

\* cited by examiner

ACTIVE LOAD MODULATION IN NEAR FIELD COMMUNICATION

BACKGROUND

The disclosed aspects relate generally to communications between and/or within devices and specifically to implementing active load modulation in near field communication (NFC).

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, near field communication (NFC), etc.

In some target NFC devices, e.g., cards, tags, etc., passive load modulation may be implemented. However, the implementation of passive load modulation in target NFC devices may lead to a limited transmission range. As such, active load modulation may be implemented to overcome the limitation. That is, the target NFC devices with active load modulation implemented may be configured to generate a signal having same spectral characteristics as signals generated by initiator NFC devices, e.g., readers, initiators, etc. However, the initiator NFC devices and the target NFC devices must be synchronized. Thus, synchronization between the signals generated by the initiator NFC devices and the target NFC devices may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects as a prelude to the more detailed description presented later.

Various aspects are described in connection with active load modulation in NFC. An example method for active load modulation includes determining a modulated portion and an unmodulated portion of a bit. Further, the example method includes during the modulated portion of the bit, holding a phase of a received carrier signal. In addition, the example method includes, during the unmodulated portion of the bit, synchronizing to the received carrier signal.

An example apparatus for active load modulation includes a control unit configured to determine a modulated portion and an unmodulated portion of a bit. Further, the example apparatus includes a phase-locked loop (PLL) configured to hold a phase of a received carrier signal during the modulated portion of the bit and to synchronize to the received carrier signal during the unmodulated portion of the bit.

Another example apparatus for active load modulation includes means for determining a modulated portion and an unmodulated portion of a bit. Further, the example apparatus includes means for holding a phase of a received carrier signal during the modulated portion of the bit. In addition, the example apparatus includes means for synchronizing to the received carrier signal during the unmodulated portion of the bit.

An example computer readable medium storing computer executable code for active load modulation includes code for determining a modulated portion and an unmodulated portion of a bit. Further, the example computer readable medium includes code for holding a phase of a received carrier signal during the modulated portion of the bit. In addition, the example computer readable medium includes code for synchronizing to the received carrier signal during the unmodulated portion of the bit.

To accomplish the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

The present aspects generally relate to synchronizing signals respectively generated by an initiator NFC device and a target NFC device, both of which may be configured to communicate using NFC. As referenced herein, a target NFC device may refer to a device, card, or tag, that can communicate wirelessly over an NFC radio interface to an initiator NFC device. Typically, the initiator NFC device such as a card reader may initiate the communication with the target NFC device. The target NFC device may respond to the initiation of the communication and start to communicate with the Initiator NFC device by transmitting signals to the initiator NFC device.

In order for the signals transmitted by the target NFC device to be correctly decoded by the initiator NFC device, the signals may be synchronized to a carrier signal generated by the initiator NFC device. That is, the target NFC device may be configured to synchronize to the carrier signal during unmodulated portions of every bit of the signals and hold a phase of the carrier signal during modulated portions of every bit of the signals.

Aspects of the present disclosure are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described herein are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 1:
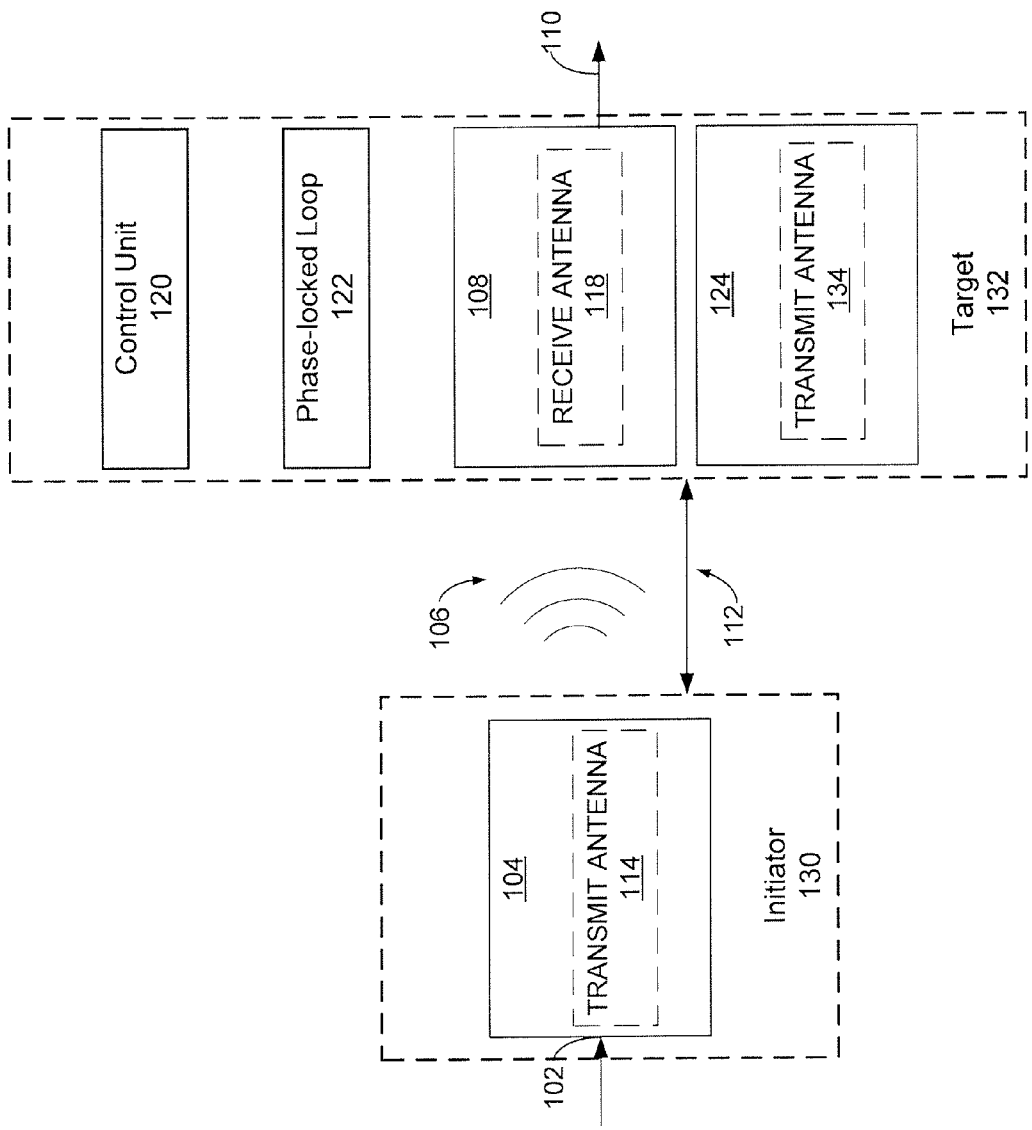
FIG. 1 is a block diagram of a wireless communication system in accordance with an aspect of the present disclosure.

FIG. 1 illustrates a wireless transmission system 100, in accordance with various aspects described herein. In some aspects, transmitter 104 may be included as part of initiator 130. In at least some examples, initiator 130 may refer to an initiator NFC device configured to provide and transmit a carrier signal as a reference to a target 132. Target 132 may further be configured to transmit modulated signals based on the carrier signal. Input power 102 is provided to a transmitter 104 for generating a radiated inductive field 106 for providing energy transfer. A receiver 108 couples to the radiated inductive field 106 and generates an output power 110 for storage or consumption by a device (not shown) coupled to the output power 110. Both the transmitter 104 and the receiver 108 are separated by a distance 112, which is also referred to herein as an operating volume (OV). In one example, transmitter 104 and receiver 108 are configured according to a mutual resonant relationship and when the resonant frequency of receiver 108 and the resonant frequency of transmitter 104 are within a threshold OV, transmission losses between the transmitter 104 and the receiver 108 are minimal (e.g., when the receiver 108 is located in the "near-field" of the radiated inductive field 106).

Transmitter 104 in the initiator 130 further includes a transmit antenna 114 for transmitting energy and signals. A receiver 108 in the target 132 includes a receive antenna 118 for receiving signal and energy if needed. The transmit antenna 114 and receive antenna 118 can be sized according to applications and devices associated therewith. As stated, an efficient energy transfer can occur by coupling a large portion of the energy in the near-field of the transmitting antenna 114 to a receiving antenna 118 rather than propagating most of the energy in an electromagnetic wave to a far field. When in this near-field, a coupling mode may be developed between the transmit antenna 114 and the receive antenna 118. The area around the antennas 114 and 118 where this near-field coupling may occur is referred to herein as a coupling-mode region. In at least some examples, target 132 may further include a transmitter 124 that performs functions substantially similar to transmitter 104. Transmitter 124 may similarly include a transmit antenna 134.

In some aspects, target 132 may further include a control unit 120 and a phase-locked loop (PLL) 122. With respect to every bit of the signals transmitted from target 132 to initiator 130, control unit 120 may be configured to determine a modulated portion and an unmodulated portion. During the modulated portion of every bit, PLL 122 may be configured to hold or maintain a phase of a received carrier signal. During the unmodulated portion of every bit, PLL 122 may be configured to synchronize to the carrier signal.

Figure 2:
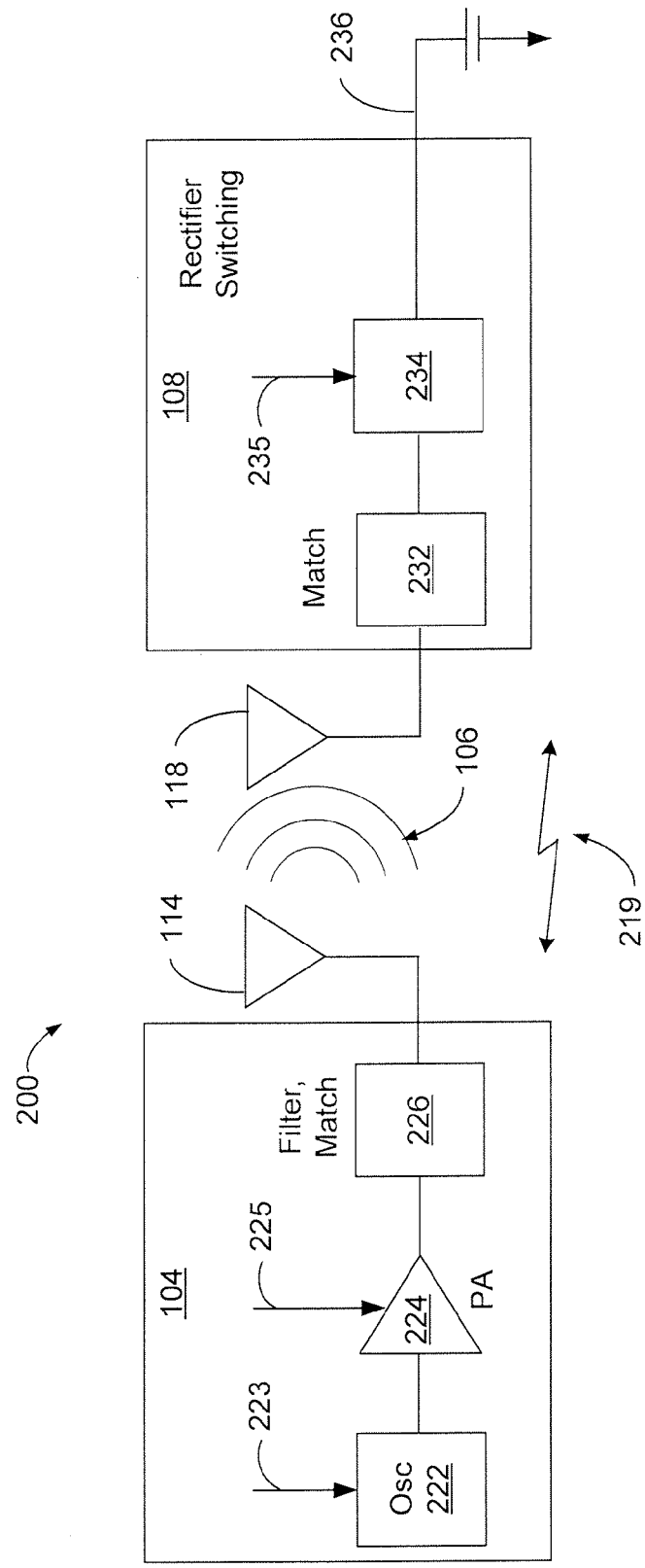
FIG. 2 is a schematic diagram of a wireless communication system in accordance with an aspect of the present disclosure.

FIG. 2 is a schematic diagram of an example near field wireless communication system 200. The transmitter 104 includes an oscillator 222, a power amplifier 224 and a filter and matching circuit 226. In some aspects, transmitter 104 may be included as part of initiator 130 (FIG. 1). The oscillator 222 is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 104 to the transmit antenna 114.

The receiver 108 may include a matching circuit 232 and a rectifier and switching circuit 234 to generate a DC power output to charge a battery 236 as shown in FIG. 2 or power a device coupled to the receiver (not shown), though it is to be appreciated that devices may each have batteries (e.g., in peer-to-peer communications) such that powering by magnetic field may not be needed. The matching circuit 232 may be included to match the impedance of the receiver 108 to the receive antenna 118. The receiver 108 and transmitter 104 may communicate on a separate communication channel 219 (e.g., Bluetooth, WiFi, zigbee, cellular, etc), in one example.

Figure 3:
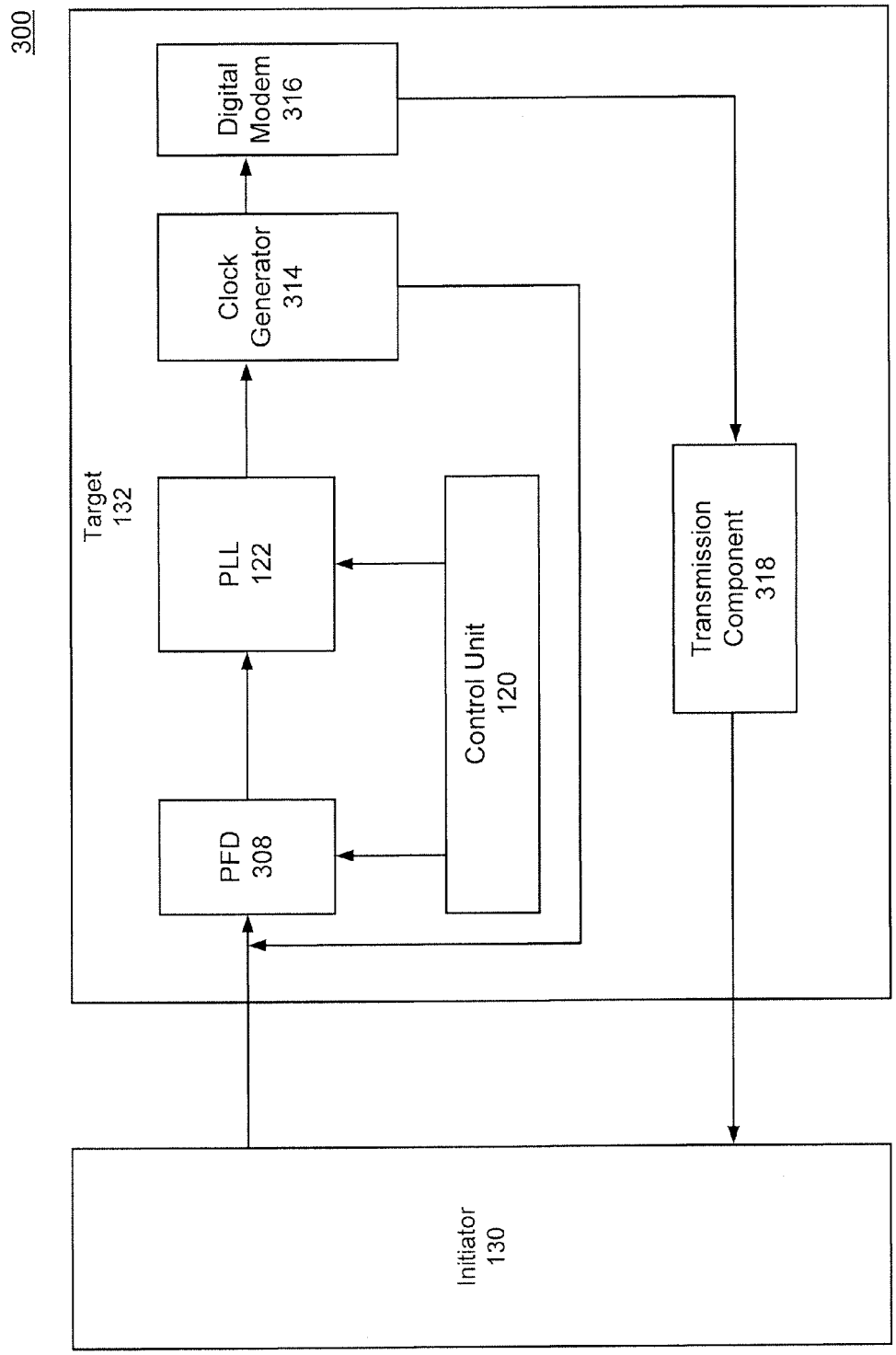
FIG. 3 is a block diagram of an NFC system in accordance with an aspect of the present disclosure.

Referring to FIG. 3, in an aspect, a block diagram of an NFC system in accordance with the present disclosure is illustrated. As depicted, initiator 130 may be in communication with target 132 in NFC. Target 132 may include a phase frequency detector (PFD) 308, PLL 122, control unit 120, a clock generator 314, a digital modem 316, and a transmission component 318.

In an aspect, initiator 130 may transmit a carrier signal to target 132 as a basis of the modulation. Since target 132 controls the signals transmitted from target 132 to initiator 130, control unit 120 may be configured to determine an unmodulated portion and a modulated portion of every bit of the signals. Since target 132 controls the signal transmitted from target 132 to initiator 130, control unit 120 may determine when to transmit "1" and when to transmit "0." Since "1" and "0" may respectively include an unmodulated portion as predetermined, control unit 120 may determine when the unmodulated portion starts and ends and accordingly activate PLL 122. That is, during the unmodulated portion of a bit, control unit 120 may be configured to activate PFD 308 and PLL 122 such that PLL 122 may synchronize the signals to the carrier signal transmitted from initiator 130. During the modulated portion of every bit of the signals, PLL 122 may be configured to hold the phase of the signals to the received carrier signal. That is, PLL 122 may be configured to maintain the phase of the signals to overcome phase shift until an unmodulated portion of the current bit or a following bit.

Based on an output signal from PLL 122, clock generator 314 may be configured to generate one or more clock signals. At least one of the clock signals may be provided as an input of PFD 308 such that PFD 308 may determine a phase relationship between the clock signal and the received carrier signal. In at least some examples, PLL 122 may be configured to synchronize the clock signal to the received carrier signal if the phase relationship indicates that the phase of the clock signal is different from the phase of received carrier signal. Further, in some examples, PFD 308 may be tri-stated and a $448^{th}$ harmonic of the clock, e.g., a frequency substantially close to 6 GHz, is utilized to synchronize the clock signal to the received carrier signal. In addition, when the determined phase relationship indicated a mismatch, PLL 122 may be configured to adjust a phase of the local clock signal.

Further, one of the clock signals may be provided to digital modem 316 as a carrier. In accordance with at least one example modulation process, the carrier may be modulated with a modulating signal that may contain information to be transmitted. The carrier modulated with the modulating signal may then be provided to transmission component 318.

In an aspect, transmission component 318 may include transmitter 124 and/or any components thereof. Transmission component 318 may be configured to transmit the modulated carrier to initiator 130.

Figure 4:
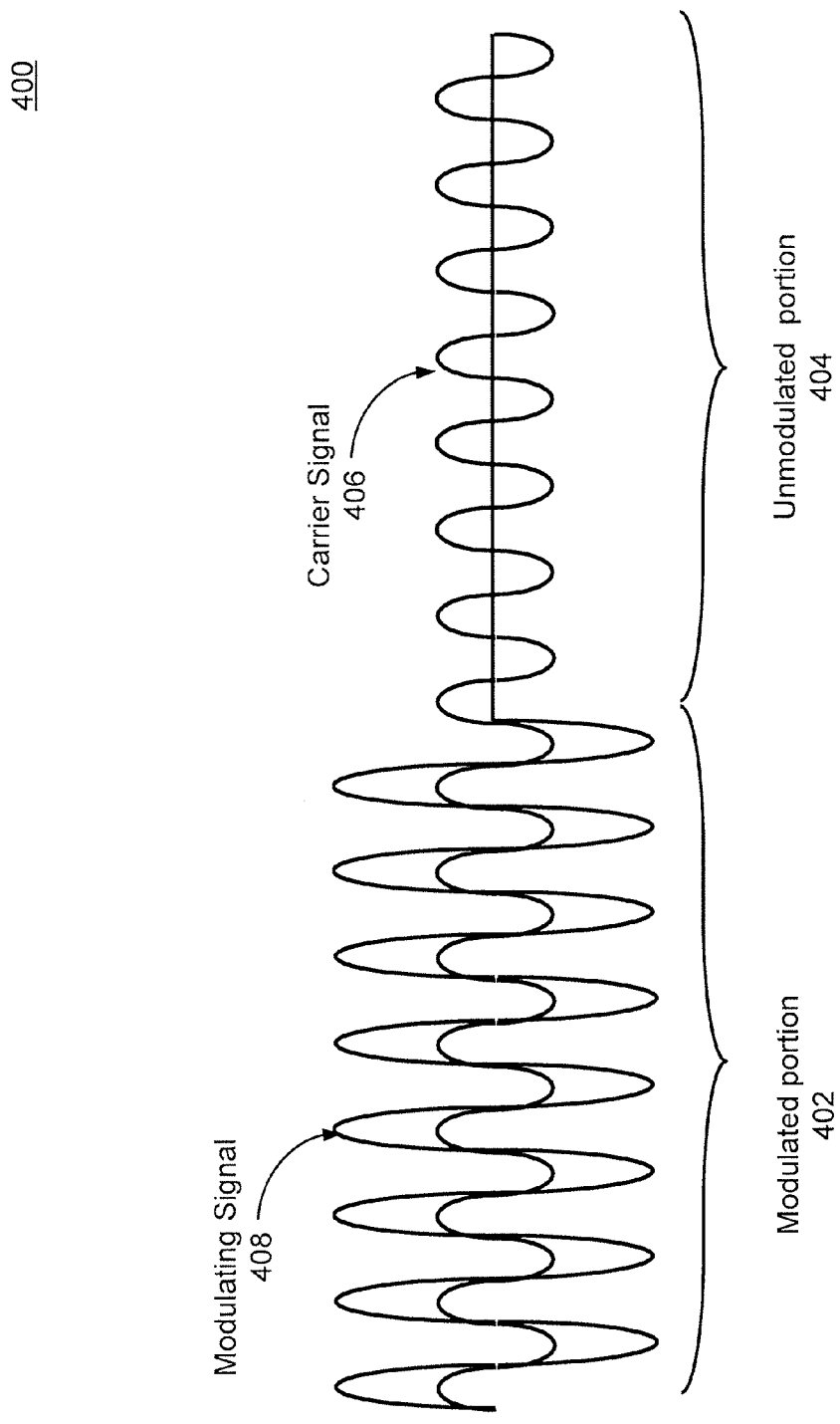
FIG. 4 is a conceptual diagram of active load modulation in accordance with an aspect of the present disclosure.

Referring to FIG. 4, a conceptual diagram of active load modulation in accordance with an aspect of the present disclosure is illustrated. As depicted, every bit of modulating signal 408 may include a modulated portion 402 and an unmodulated portion 404. During unmodulated portion 404, when the transmitter is not transmitting, modulating signal 408 does not include any waveform. As such, during transmission when modulating signal 408 is utilized to modulate carrier signal 406, the phase characteristics of carrier signal 406 during the unmodulated portion 404 may not be affected. Thus, when carrier signal 406 is modulated with modulating signal 408, the unaffected phase characteristics during the unmodulated portion 404 may be synchronized to carrier signal 406.

Figure 5:
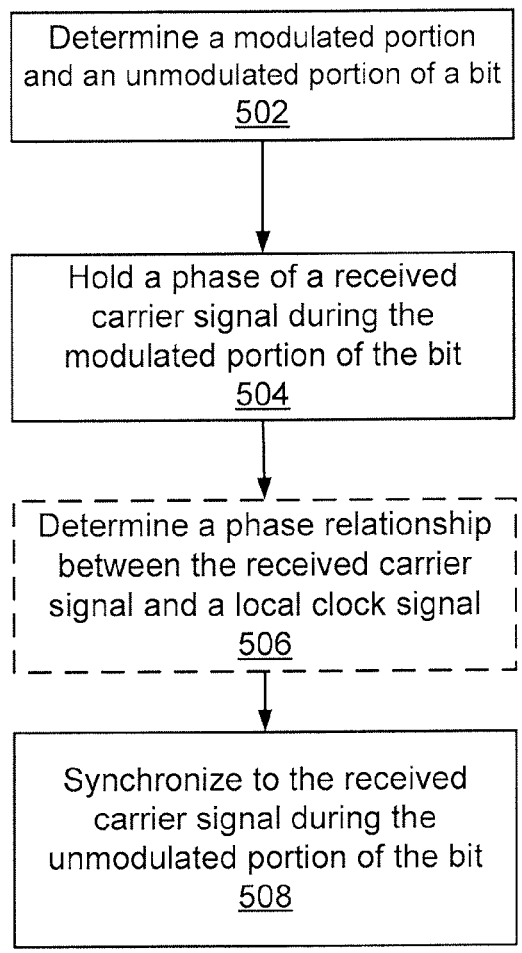
FIG. 5 is a flowchart describing an aspect of active load modulation in accordance with an aspect of the present disclosure.

Referring to FIG. 5, in an operational aspect, a flowchart describing an aspect of active load modulation is illustrated. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein. As shown herein, dash-lined blocks may indicate optional operations of the aspect of active load modulation.

In an aspect, at block 502, method 500 includes determining a modulated portion and an unmodulated portion of a bit. That is, control unit 120 may be configured to determine an unmodulated portion and a modulated portion of every bit of the signals. Since target 132 controls the signal transmitted from target 132 to initiator 130, control unit 120 may determine when to transmit "1" and when to transmit "0." Since "1" and "0" may respectively include an unmodulated portion as predetermined, control unit 120 may determine when the unmodulated portion starts and ends and accordingly activate PLL 122.

At block 504, method 500 includes holding a phase of a received carrier signal during the modulated portion of the bit. That is, during the unmodulated portion of a bit, control unit 120 may be configured to activate PFD 308 and PLL 122 such that PLL 122 may synchronize the signals to the carrier signal transmitted from initiator 130.

At block 506, method 500 includes determining a phase relationship between the received carrier signal and a local clock signal. That is, based on an output signal from PLL 122, clock generator 314 may be configured to generate one or more clock signals. At least one of the clock signals may be provided as an input of PFD 308 such that PFD 308 may determine a phase relationship between the clock signal and the received carrier signal. In at least some examples, PLL 122 may be configured to synchronize the clock signal to the received carrier signal if the phase relationship indicates that the phase of the clock signal is different from the phase of received carrier signal.

At block 508, method 500 includes synchronizing to the carrier signal during the unmodulated portion of the bit. During the modulated portion of every bit of the signals, PLL 122 may be configured to hold the phase of the received carrier signal. That is, PLL 122 may be configured to maintain the phase of the signals to overcome phase shift until an unmodulated portion of the current bit or a following bit.

Figure 6:
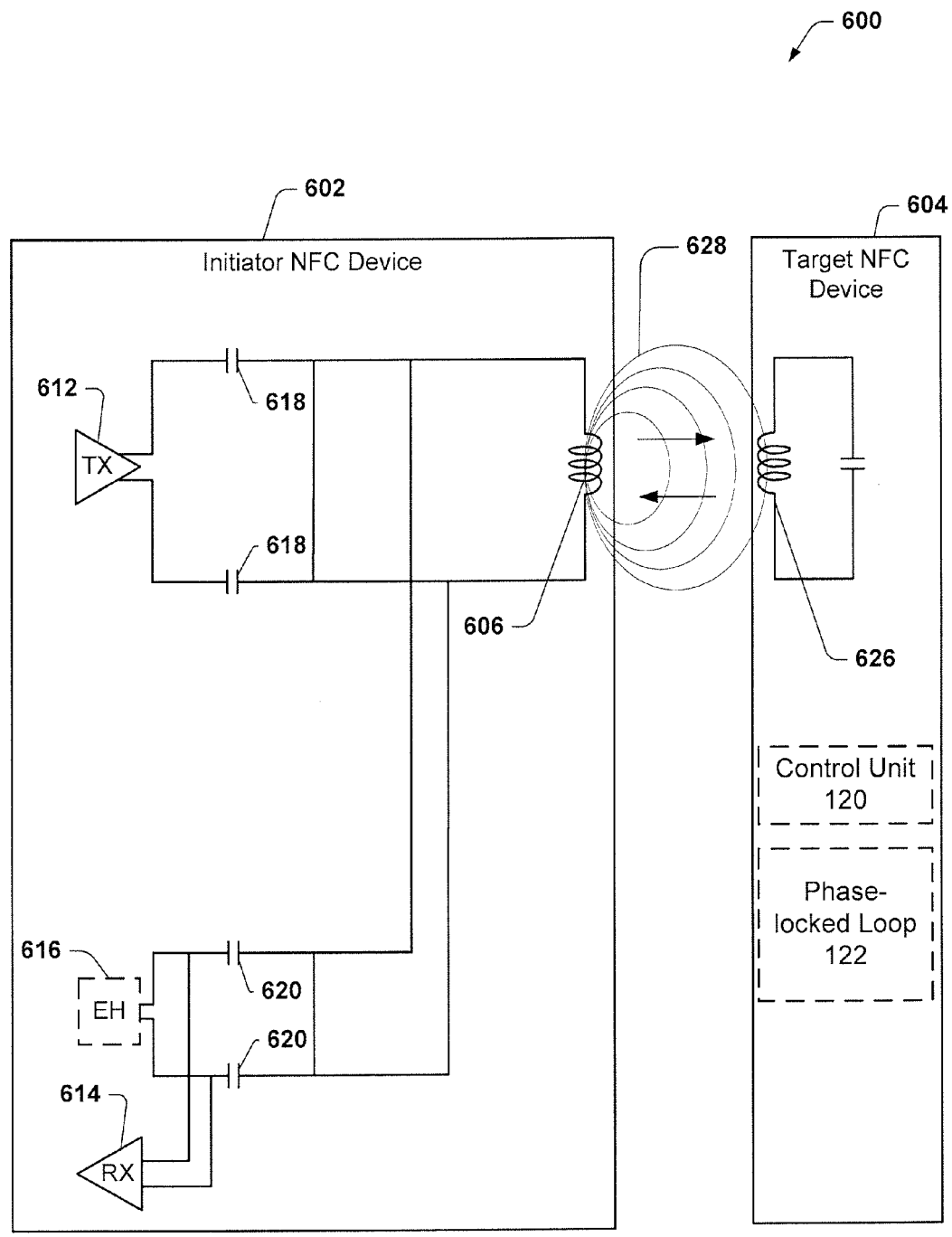
FIG. 6 is a block diagram of another NFC environment in accordance with an aspect of the present disclosure.

With reference to FIG. 6, a block diagram of a communication network 600 according to an aspect is illustrated. Communication network 300 may include an initiator NFC device 602 and a target NFC device 604 that may be configured to communicate using NFC. Initiator NFC device 602 may include a NFC antenna coil 606 configured to facilitate NFC communications with target NFC device 604, which may have a similar NFC coil 626. Target NFC device 604 may be the same as or similar to target 132. For example, target NFC device 604 may include control unit 120 (FIG. 1) and PLL 122 (FIG. 1).

As part of NFC communications, NFC antenna coil 606 may generate an electromagnetic field in the area around the NFC antenna coil 606. The strength of the field may depend on the power source and the size and number of turns in NFC antenna coil 606. Further, impedance mismatches may cause a range of amplitude/phase changes dependent on size and inductance of NFC antenna coil 606 in the magnetic field 628. Capacitor 618 may be connected in parallel with the NFC antenna coil 606, where a transmitter component 612 and capacitors 618 may form an RLC oscillator establishing a resonant circuit with a frequency that corresponds to one or more transmission frequencies of the initiator NFC device 602.

Because the wavelength of the frequency used is several times greater than the close proximity distance between the NFC antenna coil 606 and the antenna coil 626 of the target NFC device 304, the electromagnetic field can be treated as an alternating magnetic field 628. This region of close proximity is referred to as the near field region. The initiator NFC device 602 and target NFC device 604 may be linked by their mutual inductance, as in an air core transformer, with the primary coil being the NFC antenna coil 306 and the secondary coil being the antenna coil 626 of the target NFC device 604. The alternating magnetic field 628 penetrates the antenna coil 626 of the target NFC device 304 when it is in the near field region, inducing an alternating current in the antenna coil 626 of the target NFC device 604.

When operating in a listening mode, the NFC antenna coil 606, capacitors 620, optional energy harvester (EH) 616 and a receiver component 614 may form an RLC oscillator establishing a resonant circuit over which modulation of signal by target NFC device 604 can be detected. When operating in a transmitting mode, Initiator NFC device 602 may apply a variable load resistance to the NFC antenna coil 606, thereby modulating magnetic field 628, to send a transmitted signal to transfer data to the target NFC device 604.

Figure 7:
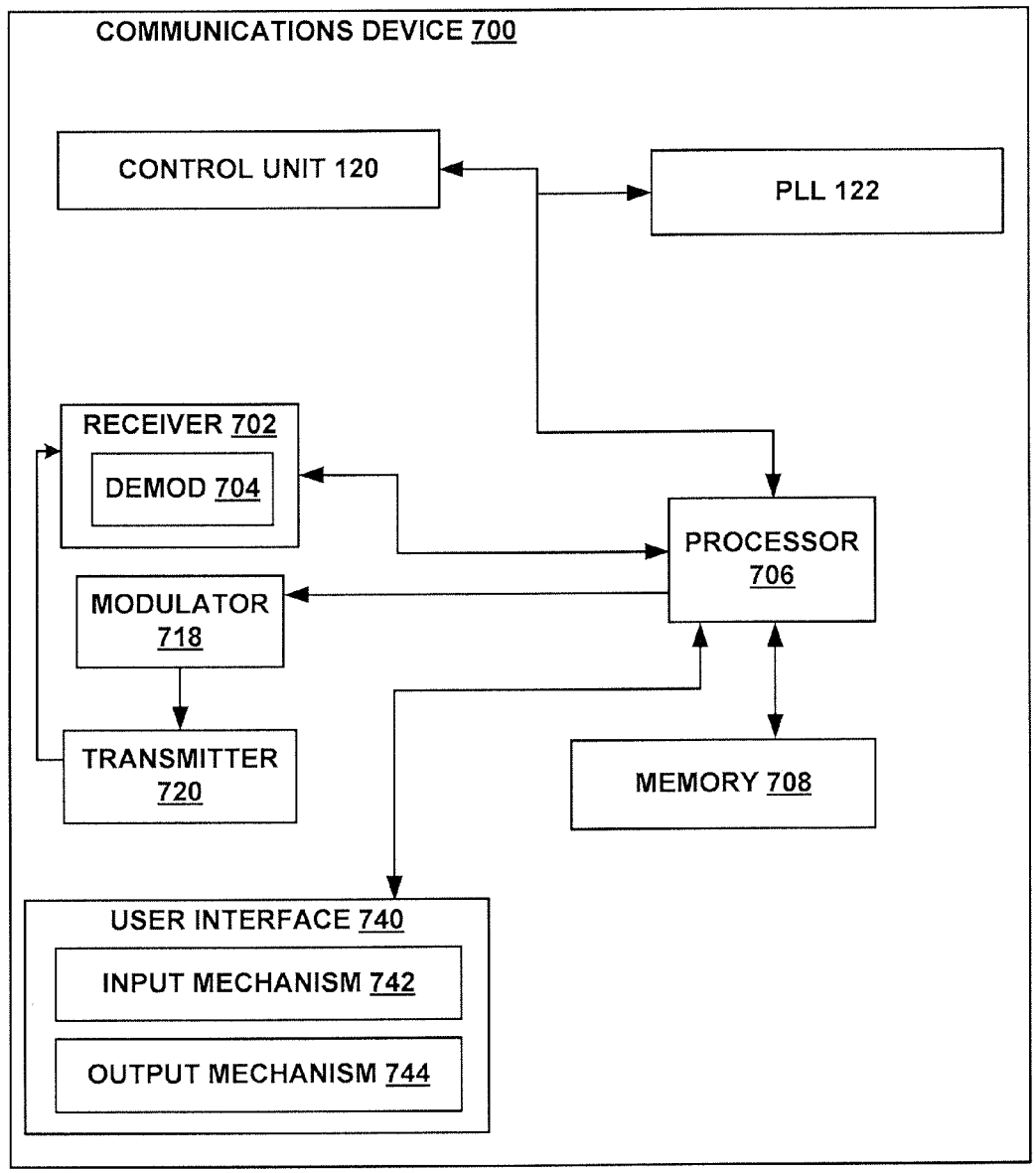
FIG. 7 is a functional block diagram example architecture of a communications device in accordance with an aspect of the present disclosure.

FIG. 7 illustrates an example architecture of communications device 700. Communications device may include initiator 130, target 132, initiator NFC device 602, target NFC device 604, etc., and may thus include components thereof and/or perform the associated functions described above. As depicted in FIG. 7, communications device 700 includes receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can include a demodulator 704 that can demodulate received symbols and provide them to processor 706 for channel estimation. Processor 706 can be a processor dedicated to analyzing information received by receiver 702 and/or generating information for transmission by transmitter 720, a processor that controls one or more components of communications device 700, and/or a processor that both analyzes information received by receiver 702, generates information for transmission by transmitter 720, and controls one or more components of communications device 700. Further, signals may be prepared for transmission by transmitter 720 through modulator 718 which may modulate the signals processed by processor 706.

Communications device 700 can additionally include memory 708 that is operatively coupled to processor 706 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, transmitter 720 can generate a transmission signal for a transmitted carrier at a transmit circuit, and receiver 702 can receive a received carrier at a receive circuit. As described, transmitter 720 can be looped back to receiver 702 so the receiver 702 can receive the unmodulated carrier. Processor 706 can include or can implement over-coupling detecting component 750 for detecting an over-coupling condition with another communications device based on comparing the received unmodulated carrier to the transmission signal generated by transmitter 720. As described, where the over-coupling condition occurs, this can be detected based on a threshold difference between a phase, amplitude, DC level, or other metric of the received carrier and transmission signal. When the over-coupling condition is detected, processor 706 can include or can implement Tx/Rx parameter component 752 for modifying a transmit or receive metric of transmitter 720 or receiver 702, as described, to mitigate the over-coupling condition. Processor 706 may also include or implement filter bypassing component 754 for bypassing one or more filters or other signal processing components of communications device 700 that may exist between the receiver 702 and over-coupling detecting component 750 to facilitate detection of over-coupling in the signal unaltered by the components.

It will be appreciated that data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory. For example, memory 608 can include instructions for performing the functions of the various components described herein.

Communications device 700 may include control unit 120 (FIG. 1) and PLL 122 (FIG. 1). Additionally, communications device 700 may include user interface 740. User interface 740 may include input mechanisms 742 for generating inputs into communications device 700, and output mechanism 744 for generating information for consumption by the user of the communications device 700. For example, input mechanism 742 may include a mechanism such as a key or keyboard, a mouse, a touch-screen display, a microphone, etc. Further, for example, output mechanism 744 may include a display, an audio speaker, a haptic feedback mechanism, etc. In the illustrated aspects, the output mechanism 744 may include a display configured to present media content that is in image or video format or an audio speaker to present media content that is in an audio format.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as NFC-A, NFC-B, NFC-f, and NFC-Vicinity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

We claim:

1. A method for active load modulation, comprising:
   receiving, at a first near field communication (NFC) device, a signal with a modulated portion and an unmodulated portion from a second NFC device, wherein the signal comprises a carrier reference signal; and
   recovering, by the first NFC device, the carrier reference signal received from the second NFC device, wherein the recovering comprises:
      during the modulated portion of the signal for each bit, maintaining, by the first NFC device, a phase of the received carrier reference signal; and
      during the unmodulated portion of the signal for each bit, synchronizing, by the first NFC device, to the received carrier reference signal.

2. The method of claim 1, further comprising:
   deter mining a phase relationship between the received carrier reference signal and a local clock signal.

3. The method of claim 2, wherein the synchronizing comprises synchronizing to the received carrier reference signal based on the determined phase relationship.

4. The method of claim 2, further comprising:
   adjusting a phase of the local clock signal when the determined phase relationship indicates a mismatch.

5. The method of claim 1, wherein the synchronizing comprises synchronizing to the received carrier reference signal with a frequency substantially close to 448th harmonic of a local clock signal or a frequency substantially close to 6 GHz.

6. An apparatus for active load modulation, comprising:
a memory storing executable instructions; and
a processor in communication with the memory, wherein the processor is configured to execute the instructions to:
receive a signal with a modulated portion and an unmodulated portion, wherein the signal comprises a carrier reference signal; and
recover the received carrier reference signal, wherein the processor is further configured to execute the instructions to:
maintain a phase of the received carrier reference signal during the modulated portion of the signal for each bit; and
synchronize to the received carrier reference signal during the unmodulated portion of the signal for each bit.

7. The apparatus of claim 6, wherein the processor is further configured to execute the instructions to determine a phase relationship between the received carrier reference signal and a local clock signal.

8. The apparatus of claim 7, wherein the processor is further configured to execute the instructions to synchronize to the received carrier reference signal based on the determined phase relationship.

9. The apparatus of claim 7, wherein the processor is further configured to execute the instructions to adjust a phase of the local clock signal when the determined phase relationship indicates a mismatch.

10. The apparatus of claim 6, wherein the processor is further configured to execute the instructions to synchronize to the received carrier reference signal with a frequency substantially close to 448th harmonic of a local clock signal or a frequency substantially close to 6 GHz.

11. The apparatus of claim 6, wherein the processor is further configured to execute the instructions to activate a phase-locked loop (PLL) for recovering the received carrier reference signal.

12. The apparatus of claim 6, wherein the processor is further configured to execute the instructions to activate a phase-frequency detector (PFD) for recovering the received carrier reference signal, wherein the PFD is tri-stated.

13. An apparatus for active load modulation, comprising:
means for receiving a signal with a modulated portion and an unmodulated portion, wherein the signal comprises a carrier reference signal; and
means for recovering the received carrier reference signal, wherein the means for recovering comprises:
means for maintaining a phase of the received carrier reference signal during the modulated portion of the signal for each bit; and
means for synchronizing to the received carrier reference signal during the unmodulated portion of the signal for each bit.

14. The apparatus of claim 13, further comprising:
means for determining a phase relationship between the received carrier reference signal and a local clock signal.

15. The apparatus of claim 14, wherein the means for synchronizing comprises means for synchronizing the local clock signal to the received carrier reference signal based on the determined phase relationship.

16. The apparatus of claim 14, further comprising:
means for adjusting a phase of the local clock signal when the determined phase relationship indicates a mismatch.

17. The apparatus of claim 13, wherein the means for synchronizing comprises means for synchronizing to the received carrier reference signal with a frequency substantially close to 448th harmonic of a local clock signal or a frequency substantially close to 6 GHz.

18. A non-transitory computer-readable medium comprising instructions, that when executed by a processor, cause the processor to:
receive a signal with a modulated portion and an unmodulated portion, wherein the signal comprises a carrier reference signal; and
recover the received carrier reference signal, wherein the non-transitory computer-readable medium comprises further instructions, that when executed by the processor, cause the processor to:
maintain a phase of the received carrier reference signal during the modulated portion of the signal for each bit; and
synchronize to the received carrier reference signal during the unmodulated portion of the signal for each bit.

19. The non-transitory computer-readable medium of claim 18, wherein the non-transitory computer-readable medium comprises further instructions, that when executed by the processor, cause the processor to:
determine a phase relationship between the received carrier reference signal and a local clock signal.

20. The non-transitory computer-readable medium of claim 19, wherein the non-transitory computer-readable medium comprises further instructions, that when executed by the processor, cause the processor to:
synchronize to the received carrier reference signal based on the determined phase relationship.

21. The non-transitory computer-readable medium of claim 19, wherein the non-transitory computer-readable medium comprises further instructions, that when executed by the processor, cause the processor to:
adjust a phase of the local clock signal when the determined phase relationship indicates a mismatch.

22. The non-transitory computer-readable medium of claim 18, wherein the non-transitory computer-readable medium comprises further instructions, that when executed by the processor, cause the processor to:
synchronize to the received carrier reference signal with a frequency substantially close to 448th harmonic of a local clock signal or a frequency substantially close to 6 GHz.

* * * * *